United States Patent
Hilliard

(10) Patent No.: US 9,783,287 B2
(45) Date of Patent: Oct. 10, 2017

(54) AIRCRAFT SPRING ASSEMBLY

(71) Applicant: Safran Landing Systems UK LTD, Gloucester, Gloucestershire (GB)

(72) Inventor: Matthew Hilliard, Gloucester (GB)

(73) Assignee: Safran Landing Systems UK LTD (GB)

( * ) Notice: Subject to any disclaimer, the term of this patent is extended or adjusted under 35 U.S.C. 154(b) by 24 days.

(21) Appl. No.: 14/987,085

(22) Filed: Jan. 4, 2016

(65) Prior Publication Data
US 2016/0194078 A1   Jul. 7, 2016

(30) Foreign Application Priority Data
Jan. 5, 2015 (EP) .................................... 15150108

(51) Int. Cl.
| | |
|---|---|
| B64C 25/10 | (2006.01) |
| B64C 25/64 | (2006.01) |
| F16F 1/12 | (2006.01) |
| F16F 7/10 | (2006.01) |
| B64C 25/00 | (2006.01) |

(52) U.S. Cl.
CPC ............ B64C 25/64 (2013.01); B64C 25/001 (2013.01); B64C 25/10 (2013.01); F16F 1/128 (2013.01); F16F 7/10 (2013.01); F16F 2222/08 (2013.01)

(58) Field of Classification Search
None
See application file for complete search history.

(56) References Cited

U.S. PATENT DOCUMENTS

| | | | | |
|---|---|---|---|---|
| 2,520,937 | A | | 9/1950 | Kennard, Jr. |
| 3,030,056 | A | * | 4/1962 | Rogers .................. F04B 39/127 248/565 |
| 3,727,899 | A | * | 4/1973 | Pemberton ............ F16F 13/002 267/34 |
| 4,712,778 | A | * | 12/1987 | Newman ................. F16F 1/125 267/170 |
| 4,871,300 | A | * | 10/1989 | Outzen ................. F04B 39/127 248/573 |
| 4,874,154 | A | * | 10/1989 | Zimbone .................. F16F 3/12 267/140.4 |
| 4,986,103 | A | * | 1/1991 | Jacobson ................ B21F 35/02 140/89 |
| 5,036,690 | A | * | 8/1991 | McGowen ............ B21C 37/121 72/137 |
| 5,105,642 | A | * | 4/1992 | Mohr ....................... B21F 3/02 140/3 CA |

(Continued)

FOREIGN PATENT DOCUMENTS

| | | |
|---|---|---|
| DE | 3008855 | 9/1980 |
| GB | 2046871 | 11/1980 |

(Continued)

OTHER PUBLICATIONS

Extended European Search Report mailed Jul. 31, 2015 for European Application No. 15150108.7-1755.

*Primary Examiner* — Medhat Badawi
(74) *Attorney, Agent, or Firm* — RatnerPrestia

(57) ABSTRACT

An aircraft spring assembly includes a helical spring having a hollow core. A polymer damping member is confined within the core and is narrower than the internal spring diameter so as to be free to move along the core.

10 Claims, 3 Drawing Sheets

(56) References Cited

U.S. PATENT DOCUMENTS

| | | | | |
|---|---|---|---|---|
| 5,361,500 | A | * | 11/1994 | Naslund .................. F16F 1/125 30/381 |
| 5,368,107 | A | * | 11/1994 | Taomo .................... B25F 5/006 173/162.2 |
| 5,452,598 | A | * | 9/1995 | Cheng ....................... B21F 3/02 72/12.6 |
| 5,551,674 | A | * | 9/1996 | Johnsen ............... B60G 17/021 267/168 |
| 5,594,616 | A | * | 1/1997 | Brecht ...................... F02P 3/02 123/655 |
| 5,615,870 | A | * | 4/1997 | Balsells .................. F16F 1/045 267/167 |
| 5,706,792 | A | * | 1/1998 | Boyer ..................... F02P 13/00 123/169 PA |
| 5,791,184 | A | * | 8/1998 | Wu ......................... B21F 35/00 72/137 |
| 5,868,996 | A | * | 2/1999 | Vondracek .............. B21F 35/00 266/103 |
| 5,875,831 | A | * | 3/1999 | Nohara .................. B21B 1/463 164/476 |
| 6,264,183 | B1 | | 7/2001 | Meier |
| 6,375,174 | B2 | * | 4/2002 | Hasegawa ................. B21F 3/02 267/166 |
| 6,471,197 | B1 | * | 10/2002 | Denk ...................... F16F 1/041 267/175 |
| 6,604,736 | B1 | * | 8/2003 | Tomczak .................. F16F 1/06 267/169 |
| 6,726,568 | B2 | * | 4/2004 | Tanaka ..................... A61B 8/12 464/52 |
| 7,357,380 | B2 | * | 4/2008 | Menzel ................ B23D 47/005 188/378 |
| 7,832,250 | B2 | * | 11/2010 | Knewtson ................. B21F 1/04 140/102 |
| 2003/0111311 | A1 | * | 6/2003 | Saito ....................... F16F 7/116 188/380 |
| 2004/0119216 | A1 | * | 6/2004 | Menzel .................. F16F 1/125 267/166 |
| 2013/0264419 | A1 | * | 10/2013 | Rammer ............... B64C 27/001 244/108 |

FOREIGN PATENT DOCUMENTS

| | | |
|---|---|---|
| GB | 2207978 | 2/1989 |
| GB | 2494782 | 3/2013 |

* cited by examiner

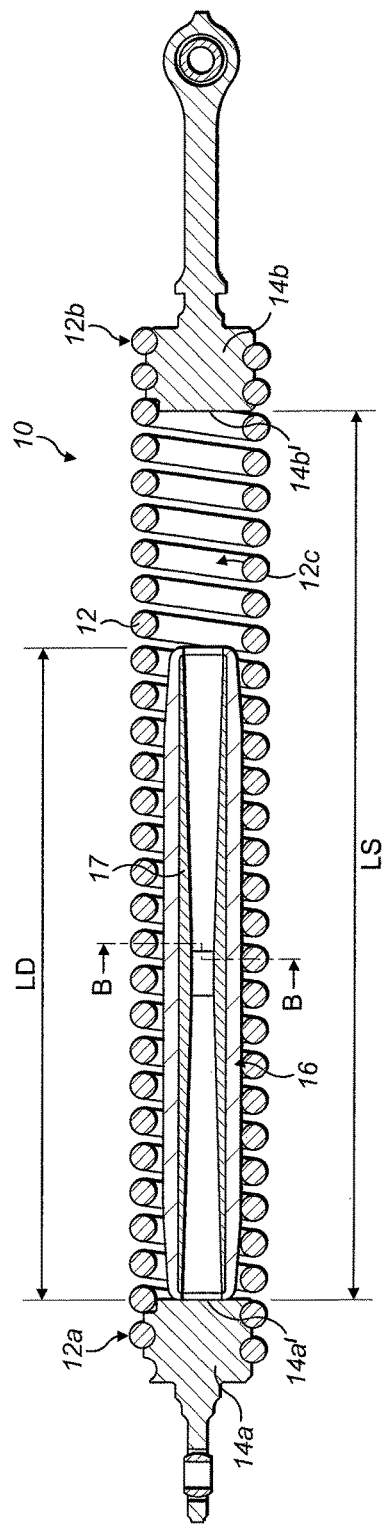
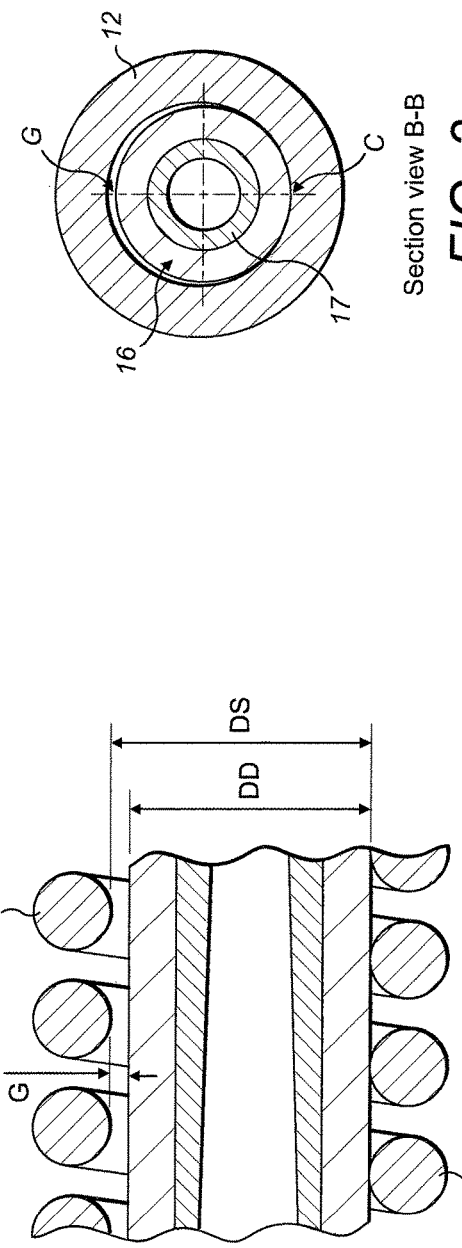

AIRCRAFT SPRING ASSEMBLY

This application claims the benefit of European Application No. 15150108.7, filed Jan. 5, 2015, which is incorporated by reference herein.

BACKGROUND OF THE INVENTION

One type of aircraft assembly is an aircraft landing gear assembly.

An aircraft landing gear assembly is generally movable between a deployed condition for take-off and landing, and a stowed condition for flight.

An actuator may be provided for moving the landing gear assembly between the deployed and stowed conditions. This type of actuator is known in the art as a "retraction actuator". A retraction actuator may have one end coupled to the airframe and another end coupled to the main strut such that extension and retraction of the actuator results in movement of the main strut between deployed and stowed conditions.

One or more stay assemblies may be provided to support the orientation of the main strut when the landing gear assembly is in the deployed condition. A stay assembly generally includes a stay and a lock link arranged to maintain the stay in a condition which corresponds to the landing gear assembly being in the deployed condition. The lock link must be 'broken' to enable the stay to be folded, permitting the main strut to be moved by the retraction actuator towards the stowed condition.

It is common for landing gear assemblies to be arranged to move towards the deployed condition in the event of a failure of the retraction actuator. Initially the assembly will move by way of gravity and in doing so the landing gear assembly forces the stay to move towards the condition which corresponds to the landing gear assembly being in the deployed condition. Down lock springs may be provided to assist in moving landing gear assembly to the deployed condition and locking it in that state by making the lock link. Landing gear assemblies for larger aircraft may be provided with a pair of down lock springs on each stay assembly.

Failure of a down lock spring has the potential to affect operation of the landing gear assembly. Similar considerations apply to other aircraft spring assemblies, such as aircraft landing gear spring assemblies.

The present inventor has identified that the potential lifespan of known aircraft spring assemblies can be improved.

SUMMARY OF THE INVENTION

As an overview, embodiments of the invention relate to an aircraft spring assembly including a helical spring having a hollow core. A polymer damping member is confined within the core and is narrower than the internal spring diameter so as to be free to move along the core.

In accordance with a first aspect of the invention there is provided an aircraft spring assembly comprising:
   a helical spring having a first end region and a second end region and a hollow core defined between the end regions;
   a first anchor element coupled to the first end region;
   a second anchor element coupled to the second end region; and
   a polymer damping member provided within the hollow core, the diameter of the damping member being less than the diameter of the spring such that the damping member can freely move along the hollow core, the length of the damping member being greater than the distance between adjacent coils of the spring when the spring is in a fully extended condition such that the damping member is confined to the hollow core as the spring moves between extended and contracted conditions.

Thus, the damping member has a 'free' fit within the spring and can damp at least some operational spring vibrations because it falls under the influence of gravity into contact with an internal surface of the spring; the vibration damping can therefore increase the potential lifespan of the spring. Also, the damping member does not affect operation of the spring because it has a smaller diameter and thus does not form an abrading, interference fit with the spring; this can further increase the potential lifespan of the spring.

The damping member can have a mass that is at least about 1/20 or at least about 1/10 the mass of the spring. In some embodiments the damping member can have a mass of at least about 0.3 kg or 0.5 kg.

The damping member can comprise an elastomer material such as rubber. An elastomer can be particularly effective at damping spring vibrations.

The damping member can have an inner core which does not contact the spring, the core being formed from a relatively dense material in comparison to the polymer, such as metal. The mass of the inner core can be chosen to fine tune the damping effect without affecting the overall size and shape of the damping member.

The length of the damping member is preferably less than the axial distance between inner axial surfaces of the anchor elements when the spring is in a contracted state. The contracted state can be a natural contracted state and/or a fully contracted state. This means that the spring can assume the contracted state without opposition from the damping member.

According to a second aspect of the invention, there is provided an aircraft landing gear assembly comprising:
   an aircraft spring assembly according to the first aspect;
   a first part attached to the first anchor element;
   a second part movably mounted with respect to the first part and attached to the second anchor element.

The first and second parts can be elements of a side stay, a lock link or elements of each.

According to a third aspect of the invention, there is provided an aircraft including one or more aircraft landing gear assemblies according to the second aspect.

BRIEF DESCRIPTION OF THE DRAWINGS

Embodiments of the invention will now be described with reference to the accompanying drawings, in which:

FIG. 1 is a diagram in cross section along the longitudinal axis of an aircraft spring assembly according to an embodiment of the invention;

FIG. 2 is a diagram in cross section along the longitudinal axis of part of the spring assembly of FIG. 1, illustrating the gap between the spring and the damping member;

FIG. 3 is a diagram in cross section orthogonal to the longitudinal axis of the spring assembly of FIG. 1;

DETAILED DESCRIPTION OF EMBODIMENT(S)

Figure 4A:
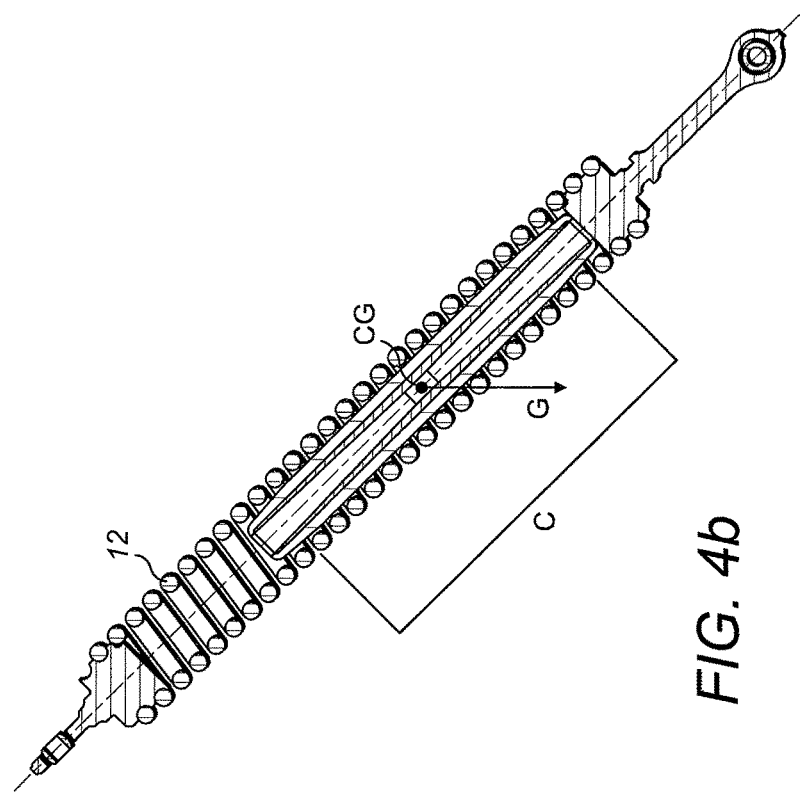
FIGS. 4a and 4b illustrate the spring assembly of FIG. 1 in different orientations.

FIG. 1 shows a spring assembly 10 according to an embodiment of the invention. The spring assembly 10 is suitable for an aircraft assembly such as an aircraft landing gear assembly.

The spring assembly 10 in this example includes a conventional helical spring 12 having a first end region 12a and a second end region 12b. The end regions 12a, 12b have the same internal diameter as the rest of hollow core 12c defined between the end regions 12a, 12b, but can have larger or smaller diameters. The spring 12 can be a titanium spring, as is commonly used in an aircraft assembly.

A conventional first anchor element 14a is coupled to the first end region 12a in a known manner, such as via a threaded portion that is wound into the spring 12. The first anchor element 14a is used to couple the spring 12 to part of an aircraft assembly in a known manner. Likewise, a conventional second anchor element 14b is coupled to the second end region 12b in a known manner.

The present inventor has identified that, in use, a spring of an aircraft assembly can vibrate due to incident airflow and/or vibration of other parts of the assembly. This can cause premature failure of the spring.

The spring assembly 10 further includes a polymer damping member 16 that is provided within the hollow core 12c. The damping member 16 can comprise any suitable polymer material; it is preferred that the damping member 16 is formed from an elastomer material such as rubber; an elastomer can be particularly effective at damping high frequency spring vibrational energy.

The damping member 16 has a 'free' fit within the spring 12 i.e. it is not positionally restrained within the hollow core 12c. It is preferred that the damping member 16 is generally cylindrical in shape with tapered relatively narrow end regions to help it slide along the inner core 12c of the spring 12.

Figure 4B:
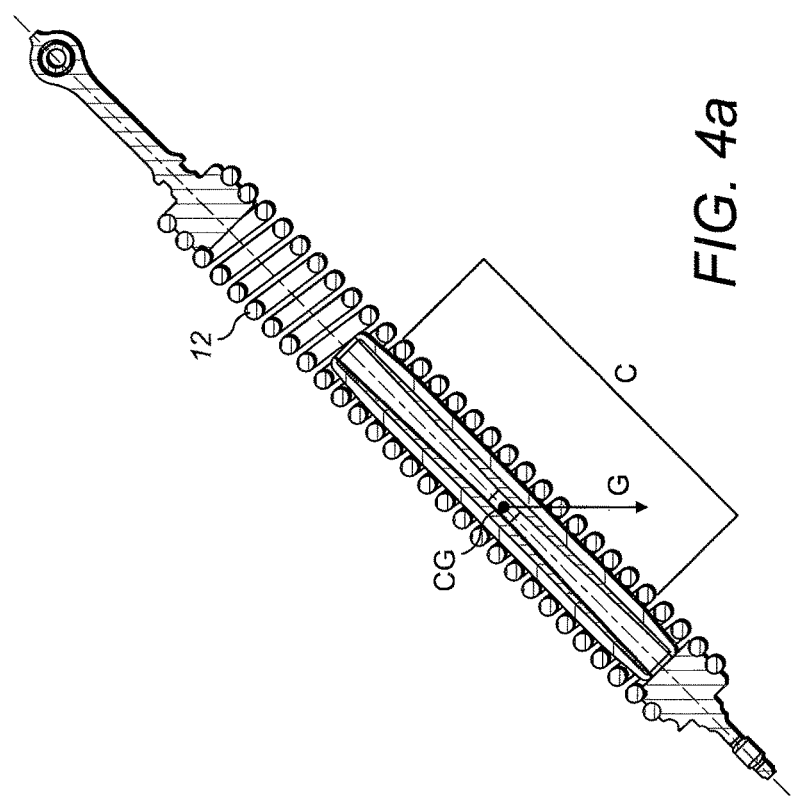

Referring additionally to FIGS. 2 and 3, the diameter DD of the damping member 16 is less than the diameter DS of the spring 12 such that a radial gap G exists between them. The damping member 16 can therefore freely move along the hollow core 12c between the inner axial face 14a' of the first anchor element 14a and the inner axial face 14b' of the second anchor element 14b. Although the spring diameter DS reduces in size as the spring 12 is extended, the variation is substantially less than the gap G meaning that the damping member 16 can freely move along the hollow core 12c as the spring 12 moves between extended and contracted conditions. As the spring 12 orientation changes, the damping member 16 falls by way of gravity against the lowest portion of the spring 12 which forms a damping contact region C, as illustrated in FIGS. 4a and 4b. The centre of gravity of the damping member 16 is shown at point CG and the gravitational direction indicated by arrow G.

The length LD of the damping member 16 is greater than the distance between adjacent coils of the spring 12 when the spring is in a fully extended condition such that the damping member 16 is confined to the hollow core 12c as the spring 12 moves between extended and contracted conditions. It is preferred that the length LD of the damping member is less than the inner length LS of the spring i.e. the axial distance between inner axial surfaces 14a', 14b' of the anchor elements 14a, 14b when the spring is in a contracted state. The contracted state can be a natural/default contracted state in the case of a tension spring and/or a fully contracted state in the case of a compression spring.

Thus the damping member 16 can absorb and damp at least some high frequency operational spring vibrations through contact with an internal surface of the spring 12, which can increase the potential lifespan of the spring, without affecting the spring properties at low frequencies such as during extension and retraction. Also, the damping member 12 does not affect operation of the spring 12 because it has a smaller diameter and thus does not form an abrading, interference fit with the spring 12; this can further increase the potential lifespan of the spring 12.

The damping member 16 can have an inner core 17 which is at least partially encapsulated so that it does not contact the spring 12, the core 17 being formed from a relatively dense material in comparison to the polymer, such as metal. The mass of the inner core 17 can be chosen to fine tune the damping effect provided by the damping member 16 without affecting the overall size and shape of the damping member 16.

As will be appreciated by a skilled person, an appropriate mass for the damping member 16 for a given spring 12 can be established by frequency testing; for example, a rigged up spring can be excited to vibrate at an expected operational spring frequency. The spring is then provided with a damping member of, for example, a mass that is at least about 1/10 the mass of the spring 12, and the spring 12 is excited in a corresponding manner such that the effect of the damping member 16 can be observed. In some embodiments the damping member 16 can have a mass of at least about 0.3 kg or 0.5 kg. In one specific example, the damping member can have a mass of 0.65 kg when used in conjunction with a titanium down lock spring having a mass of 4.8 kg.

Figure 5:
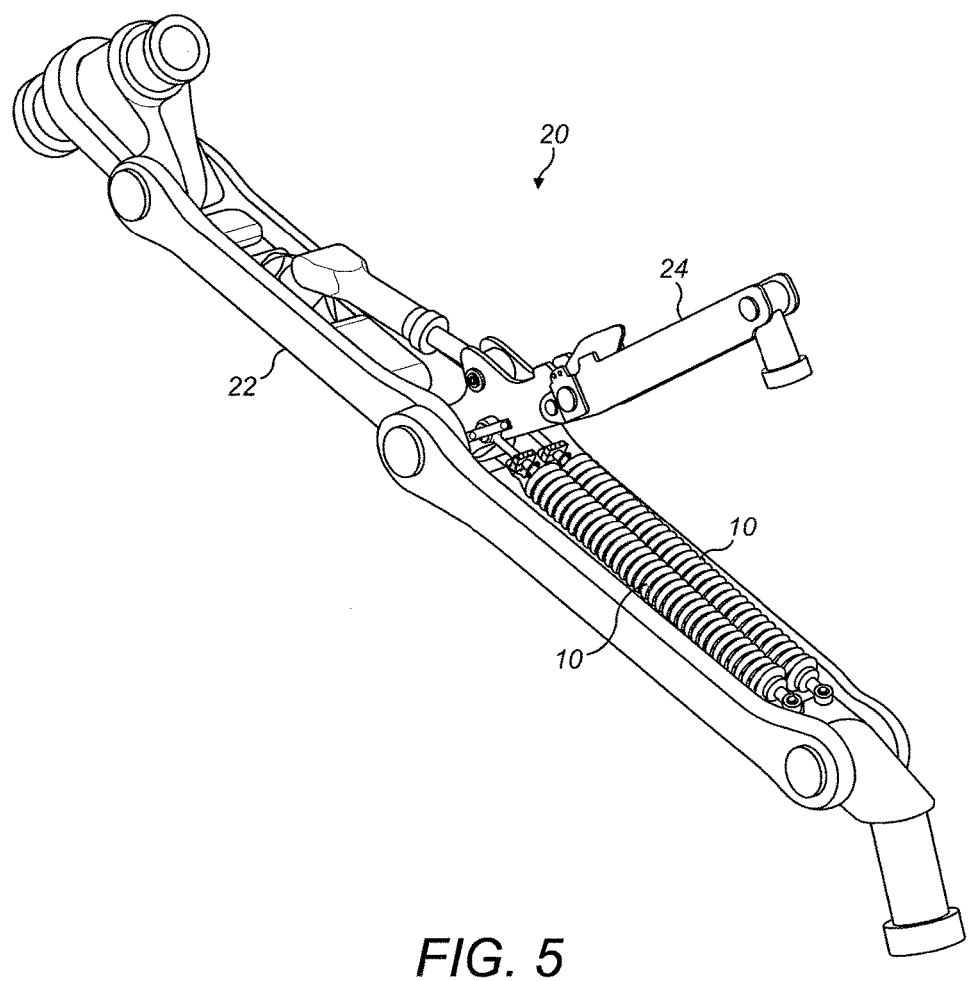
FIG. 5 is a diagram of an aircraft landing gear assembly according to an embodiment of the invention.

FIG. 5 shows an aircraft landing gear assembly 20 including a pair of spring assemblies 10 according to an embodiment of the invention each provided as a down lock spring coupled between an arm of the side stay 22 and an arm of the lock link 24. However, aircraft spring assemblies according to embodiments of the invention can usefully be applied to other aircraft assemblies where it is desired to reduce spring vibration.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention may be implemented by means of hardware comprising several distinct elements. In a device claim enumerating several parts, several of these parts may be embodied by one and the same item of hardware. The mere fact that certain measures are recited in mutually different dependent claims does not indicate that a combination of these measures cannot be used to advantage.

The invention claimed is:

1. An aircraft spring assembly comprising:
    a helical spring having a first end region and a second end region and a hollow core defined between the first end region and the second end region;
    a first anchor element coupled to the first end region;
    a second anchor element coupled to the second end region; and
    a polymer damping member provided within the hollow core, the diameter of the damping member being less than the diameter of the spring such that the damping member is freely movable along the hollow core, the length of the damping member being greater than the distance between adjacent coils of the spring when the spring is in a fully extended condition such that the damping member is confined to the hollow core as the spring moves between extended and contracted conditions.

2. The aircraft spring assembly according to claim 1, wherein the damping member comprises an elastomer material.

3. The aircraft spring assembly according to claim 1, wherein the damping member has a mass that is at least 0.05 times the mass of the spring.

4. The aircraft spring assembly according to claim 1, wherein the damping member includes a core formed from a relatively dense material in comparison to the polymer.

5. The aircraft spring assembly according to claim 1, wherein the length of the damping member is less than the axial distance between inner axial surfaces of the anchor elements when the spring is in a contracted state.

6. The aircraft spring assembly according to claim 5, wherein the contracted state is a natural contracted state and/or a fully contracted state.

7. An aircraft landing gear assembly comprising: an aircraft spring assembly comprising: a helical spring having a first end region and a second end region and a hollow core defined between the first end region and the second end region; a first anchor element coupled to the first end region, a second anchor element coupled to the second end region, and a polymer damping member provided within the hollow core, the diameter of the damping member being less than the diameter of the spring such that the damping member is freely movable along the hollow core, the length of the damping member being greater than the distance between adjacent coils of the spring when the spring is in a fully extended condition such that the damping member is confined to the hollow core as the spring moves between extended and contracted conditions; a first part attached to the first anchor element; and a second part movably mounted with respect to the first part and attached to the second anchor element.

8. The aircraft landing gear assembly according to claim 7, wherein the first part is a stay arm and the second part is a lock link arm, the spring serving as a down lock spring.

9. An aircraft including one or more aircraft landing gear assemblies comprising: an aircraft spring assembly comprising: a helical spring having a first end region and a second end region and a hollow core defined between the first end region and the second end region, a first anchor element coupled to the first end region, a second anchor element coupled to the second end region, and a polymer damping member provided within the hollow core, the diameter of the damping member being less than the diameter of the spring such that the damping member is freely movable along the hollow core, the length of the damping member being greater than the distance between adjacent coils of the spring when the spring is in a fully extended condition such that the damping member is confined to the hollow core as the spring moves between extended and contracted conditions; a first part attached to the first anchor element; and a second part movably mounted with respect to the first part and attached to the second anchor element.

10. An aircraft assembly including an aircraft spring assembly comprising: a helical spring having a first end region and a second end region and a hollow core defined between the first end region and the second end region; a first anchor element coupled to the first end region; a second anchor element coupled to the second end region; and a polymer damping member provided within the hollow core, the diameter of the damping member being less than the diameter of the spring such that the damping member is freely movable along the hollow core, the length of the damping member being greater than the distance between adjacent coils of the spring when the spring is in a fully extended condition such that the damping member is confined to the hollow core as the spring moves between extended and contracted conditions.

* * * * *